8972X
E. Reynolds,
Bending Wood,
Patented July 17, 1835.
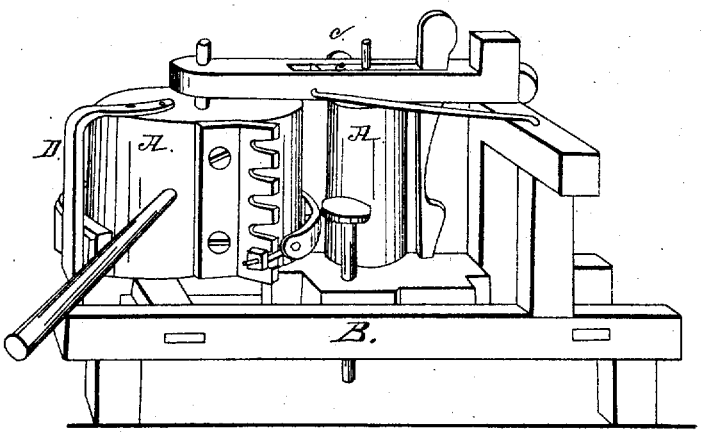
AM. PHOTO-LITHO. CO. N.Y. (OSBORNE'S PROCESS.)

(Extended for Seven years from 17th July 1849)

July 17 1835

8972X
7/17/1835

Edward Reynolds of Haddonfield New Jersey.

Letters Patent

The schedule referred to in these Letters Patent and making part of the same containing a description in the words of the said Edward Reynolds himself of his improvement in a Machine for bending or setting fellies for the wheels of carriages and waggons.

To all whom it may concern,

Be it known that I Edward Reynolds of Haddonfield in the County of Gloucester, and State of New Jersey, have invented a new and useful machine for bending or setting fellies for the wheels of carriages and waggons of all description and that the following is a full and exact description thereof.

The fellies are to be semicircles, or nearly so, it being intended generally that two or three should form the rim of a wheel. The timber either sawed or split, is to be bent round cylinders, which cylinders may be somewhat less in diameter say one fourth or one fifth, than that of the interior of the wheel. The bending machine is furnished with two such cylinders, one of them intended for the larger and the other for the smaller sized wheels - These I make of wood of such thickness that for the lighter kind of wheels three may be bent thereon, side by side, at the same time. These cylinders are placed horizontally upon a stout bench immovably fixed. each of the cylinders revolves on a strong bolt forming its axis. One of these bolts is permanent fixed in the bench, the other passes at each end through a slit or mortice in the bench, and in a piece of timber placed above the cylinders to receive them This is for the purpose of regulating the distance of the cylinders from each other, which should in all cases be equal to that of the thickness of the timber to be bent. A regulating screw is made to operate upon each end of the sliding bolt, or rather against a sliding block, which receives the bolt. It will be found convenient to remove a part of each of the cylinders, say one fourth from the larger and one sixth from the smaller by cutting their circumference, by a vertical section in a straight line, a sufficient portion of the cylinder being still left to effect the setting or bending. A hole is mortised in the middle of the straight part of each cylinder to receive a handspike by which to apply the requisite power. When cut down off the mortice must be made in the edge of the

[illegible] 1835

[illegible]

[illegible] 8972X cylinder. At one of the angles formed by the straight and curved part on each cylinder an iron clevis is to be fixed to secure under it and confine one of the ends of the stuff which the fellos are to be formed and holes are bored at suitable distances around the edges of the cylinder, to receive the bolt of a moveable or shifting clevis which is used to confine the other end of the stuff after it has been set. The edges of the cylinder should be graduated or marked off in feet and inches, in order to determine (with facility) the exact place at which they must stand when the process of bending is commenced to cause the angle on the cylinder to come one or two inches short of the end of the felloe) when bent in order to afford sufficient room for the affixing of the shifting clevis. When the machine is to be used, the stuff to be bent is prepared by boiling or steaming in the usual manner. One of its ends is then placed under the stationary clevis together with a piece of hoop iron of proper length and width which, as the stuff is bent laps round its outer edge and prevents the formation of checks and splinters, the other ends of these iron straps I sometimes make to terminate in a screw furnished with a nut, which may be passed through an iron plate on the edge of the cylinder, the strap may then be drawn firmly around the felloes, as shown in the model and drawing deposited in the Patent office.

What I claim as my invention and for what I ask a Patent is the machine or apparatus as herein described, and may ~~be~~ properly be denominated revolving cylinders to be used for the bending of Felloes, for carriages and waggons of all descriptions, sleigh runners, iron tires for wheels, coopers setts hoops, vessels mast hoops &c. In which machine two cylinders are employed operating together by means of certain accessary parts in the manner or upon the principles herein set forth, not intended however to limit myself in the formation of the accessary parts or to the specifics are herein stated, but to vary these in any way and to apply them to any use not varying from the principle as I may find convenient whilst the machine continues substantially the same and a similar effect is produced by analagous means

Witnesses

William Watson  Claim/160  Edward Reynolds

John Clement [illegible]

[illegible]

[illegible] 1837